(12) United States Patent
Holmes et al.

(10) Patent No.: US 6,889,065 B2
(45) Date of Patent: May 3, 2005

(54) SYSTEM AND METHOD FOR PROVIDING AN ADAPTER MODULE

(75) Inventors: David William James Holmes, Sammamish, WA (US); Edward D. Schmitt, Gresham, OR (US); Ibrahim Mohamed, Bothell, WA (US); Thomas Edwin East Nelson, Sammamish, WA (US)

(73) Assignee: Cingular Wireless II, LLC, Redmond, WA (US)

( * ) Notice: Subject to any disclaimer, the term of this patent is extended or adjusted under 35 U.S.C. 154(b) by 586 days.

(21) Appl. No.: 10/036,151

(22) Filed: Dec. 31, 2001

(65) Prior Publication Data

US 2002/0197911 A1 Dec. 26, 2002

Related U.S. Application Data

(60) Provisional application No. 60/300,842, filed on Jun. 25, 2001.

(51) Int. Cl.[7] ............................. H04B 1/38; H04B 5/00; H04M 1/00
(52) U.S. Cl. ................. 455/569.2; 455/569.1; 455/41.2
(58) Field of Search ..................... 455/569.1, 569.2, 455/556.1, 557, 550.1, 575.1, 575.6, 575.9, 575.8, 90.3, 41.1, 41.2, 66, 426.1; 320/103, 108, 114

(56) References Cited

U.S. PATENT DOCUMENTS

| | | |
|---|---|---|
| 5,479,479 A | 12/1995 | Braitberg et al. |
| 5,535,274 A | 7/1996 | Braitberg et al. |
| 5,546,458 A | 8/1996 | Iwami |
| 5,590,414 A | 12/1996 | Marui et al. |
| 5,653,336 A | 8/1997 | Buonaiuto et al. |
| 5,857,013 A | 1/1999 | Yue et al. |
| 6,075,999 A | 6/2000 | Vilmi et al. |

(Continued)

FOREIGN PATENT DOCUMENTS

| | | |
|---|---|---|
| EP | 0 920 170 A2 | 6/1999 |
| EP | 1 107 546 | 6/2001 |
| WO | WO99/45687 | 9/1999 |
| WO | WO99/45691 | 9/1999 |

OTHER PUBLICATIONS

Krebs, Michelle, "Digital Link for Car Talk,", From Escapes/Bells and Whistles, Sep. 6, 2002, p. 1, The New York Times Website, Automobiles.
U.S. Appl. No. 09/972,572, Filed Oct. 3, 2001, Holmes et al.
U.S. Appl. No. 10/036,109, Filed Dec. 31, 2001, Schmitt et al.
U.S. Appl. No. 10,036,188, Filed Dec. 31, 2001, Holmes et al.
PCT/US02/20165; Written Opinion mailed Aug. 21, 2003.

*Primary Examiner*—Lee Nguyen
*Assistant Examiner*—Raymond B. Persino
(74) *Attorney, Agent, or Firm*—Perkins Coie, LLP (57) ABSTRACT

Disclosed embodiments include a system and method for adapting a wireless device, such as a Bluetooth-enabled mobile device or other Bluetooth-enabled device to a hands-free car kit or similar system. The adapter module is physically configured so that it can be inserted directly into the cradle in place of the phone. Once inserted into the cradle, the adapter module makes electrical contact with the connector in the cradle with a matching connector on one side of the adapter module. The mated connectors provide power to the adapter module and bi-directional communications between the adapter module and the hands-free car kit. The adapter module includes circuitry for communicating with the Bluetooth-enabled mobile device and the hands-free car kit in order to exchange communications signals between the Bluetooth-enabled mobile device and the hands-free car kit.

25 Claims, 8 Drawing Sheets

U.S. PATENT DOCUMENTS

| | | | |
|---|---|---|---|
| 6,101,403 A | 8/2000 | Masuda | |
| 6,138,041 A | 10/2000 | Yahia | |
| 6,154,663 A | 11/2000 | Itamochi | |
| 6,163,690 A | 12/2000 | Lilja | |
| 6,184,651 B1 | 2/2001 | Fernandez et al. | |
| 6,195,572 B1 | 2/2001 | Patterson et al. | |
| 6,217,351 B1 | 4/2001 | Fung et al. | |
| 6,255,800 B1 | 7/2001 | Bork | |
| 6,266,544 B1 | 7/2001 | Tomura et al. | |
| 6,341,218 B1 | 1/2002 | Poplawsky et al. | |
| 6,349,223 B1 | 2/2002 | Chen | |
| 6,377,825 B1 * | 4/2002 | Kennedy et al. | 455/569.2 |
| 6,397,086 B1 | 5/2002 | Chen | |
| 6,542,758 B1 * | 4/2003 | Chennakeshu et al. | 455/569.2 |
| 6,687,517 B2 * | 2/2004 | Kinnunen | 455/569.1 |
| 2001/0049262 A1 | 12/2001 | Lehtonen | |
| 2002/0032042 A1 | 3/2002 | Poplawksy et al. | |

\* cited by examiner

SYSTEM AND METHOD FOR PROVIDING AN ADAPTER MODULE

CROSS-REFERENCE TO RELATED APPLICATION(S)

This application claims the benefit of U.S. Provisional Patent Application No. 60/300,842, filed Jun. 25, 2001.

TECHNICAL FIELD

Embodiments of the invention relate generally to adapters for coupling to wireless communicating devices.

BACKGROUND

In order to participate in wireless telecommunications more easily while driving, many drivers have endured considerable expense in terms of time, money and effort, to have a hands-free car kit professionally installed in their vehicles. The primary advantage to the hands-free car kit is that users can carry on a conversation without having to hold a mobile handset to their ear. This frees up the hand that otherwise would have been holding the handset to perform other tasks, such as driving the car. The hands-free car kit may even provide other advantages such as superior reception and sound quality as compared to the handset alone.

In a typical usage scenario, the user dials a phone number on their mobile handset to place a call, or receives a call from another user. The user places the handset into a special cradle which has been customized for physically holding that handset and for providing electrical connections to a microphone, speakers and possibly an antenna, as may be associated with the hands-free car kit. In many cases, the cradle and related electrical connections are adapted to only one handset model or a small number of closely related handsets. The very limited number of phones that a hands-free car kit can work with becomes a problem when the user desires to change to a new or different mobile phone handset. The user may want to change their handset because it offers better features, is associated with a different wireless service provider desired by the user or for any other reason.

Newer phones have historically been smaller and differently shaped from existing phones, again giving rise to incompatibility with previously installed hands-free car kits. Other concurrently offered mobile handsets tend to have different physical and electrical characteristics. Previously installed hands-free car kits can be replaced with newer or different hands-free car kits associated with a replacement handset. Unfortunately, replacement of the existing hands-free car kit would involve considerable expense in terms of time, money and effort, not only to install the replacement hands-free car kit, but to remove the existing hands-free car kit. It would be desirable to be able to reduce the time, money and/or effort associated with replacing a previously installed hands-free car kit when the user replaces the handset matching the existing hands-free car kit with a newer or different handset that is substantially incompatible with the existing hands-free car kit.

In the drawings, the same reference numbers identify identical or substantially similar elements or acts. To easily identify the discussion of any particular element or act, the most significant digit or digits in a reference number refer to the Figure number in which that element is first introduced, e.g., element 102 is first introduced and discussed with respect to FIG. 1.

Note that the headings provided herein are for convenience and do not necessarily affect the scope or interpretation of the invention.

DETAILED DESCRIPTION

Aspects of the invention overcome many of the limitations described in prior and current hands-free car kits and provide additional benefits by creating a unique adapter using a Bluetooth-enabled adapter module to support Bluetooth enabled mobile devices without requiring the device to physically and electrically match a cradle in an existing hands-free car kit. The adapter module establishes a communications link with a Bluetooth-enabled mobile device such as a mobile telephone handset or the like, using communications protocols established under the Bluetooth standard.

In one embodiment an adapter module is provided which fits into a cradle of a hands-free car kit. The adapter module is physically configured so that it can be inserted directly into the cradle in place of the phone. Once inserted into the cradle, the adapter module makes electrical contact with the connector in the cradle with a matching connector on one side of the adapter module. The mated connectors provide power to the adapter module and bi-directional communications between the adapter module and the hands-free car kit. From the perspective of the hands-free car kit, the adapter module emulates the communication style of a compatible device.

The adapter module contains a Bluetooth chip or chipset for communicating with a Bluetooth-enabled mobile device, which is defined to include any Bluetooth-enabled device used for communications. The Bluetooth-enabled mobile device may have an integrated Bluetooth capability added during manufacture or may be upgraded to contain the Bluetooth capability after manufacture. In any case, the adapter module exchanges digitized information, such as digitized spoken words, with the Bluetooth-enabled mobile device, thereby allowing users to carry on a conversation with a remote user via the user's hands-free car kit and their now Bluetooth-enabled mobile device.

Embodiments of the invention described herein provide an adapter module for adapting a hands-free car kit to a Bluetooth-enabled mobile device, allowing all Bluetooth-enabled mobile devices to utilize an existing or otherwise incompatible hands-free car kit. Presently available and presently installed hands-free car kits only work with a very limited number of mobile devices. The invention enables such hands-free car kits to work with any Bluetooth-enabled mobile device. Significantly mitigating the associated costs of acquiring a compatible hands-free car kit in terms of time, money and effort with upgrading to any Bluetooth-enabled phone. Once an embodiment of the invention is installed with a hands-free car kit, any number of future substitutions of different Bluetooth-enabled mobile devices will incur no additional cost regarding the hands-free car kit, because the hands-free car kit in combination with the adapter module will be compatible with all such Bluetooth-enabled mobile devices and other such Bluetooth-enabled devices. Embodiments of the invention thereby make it easier for a user to upgrade as often as they choose to better Bluetooth-enabled mobile devices, or change to more cost-effective Bluetooth-enabled mobile devices.

"Bluetooth" refers to a set of specifications designed to standardize wireless transmission between a wide variety of devices, such as personal computers ("PCs"), cordless telephones, headsets, printers, personal digital assistants ("PDAs"), etc. Bluetooth acts as a "virtual cable," whereby a computer can automatically use a mobile telecommunications device (such as a mobile cell phone) to send data wirelessly, such as exchange e-mail, transmit data to a fax machine, etc. Under the Bluetooth specification, Bluetooth devices will operate in a part of the electromagnetic spectrum that most countries, including the United States, have agreed will remain unlicensed. The Bluetooth transceiver operates in the 2.4 GHz ISM band. The Bluetooth spectrum ranges from 2.4000 GHz to 2.4835 GHz, thus yielding 83.5 MHz of allocated bandwidth which includes a 2 MHz lower guardband, a 3.5 MHz upper guard band and 78 1 MHz channels in the available 78 MHz between the guardbands for communications. Bluetooth operates using frequency hopping spread spectrum, where data packets are spread across the Bluetooth Spectrum at a nominal rate of 1,600 hops per second to lessen interference and fading. According to the Bluetooth specification, Bluetooth devices are slated to operate their antennas, for example having zero directional gain, at one of three different maximum antenna power levels, i.e., 1 mW, 2.5 mW and 100 mW. The nominal link range is 10 meters, and the gross data rate is 10 Mbps, although increases may be possible.

Details on Bluetooth may be found at http://www.Bluetooth.com, http://www.palowireless.com, "Bluetooth Revealed", Miller & Bisdikian, Prentice Hall PTR, 2001, and "Bluetooth Demystified", Muller, McGraw-Hill, 2001, and in particular, "Specification of the Bluetooth System," version 1.1: http://www.Bluetooth.com/developer/specification/specification.asp.

The following description provides specific details for a thorough understanding of, and enabling description for embodiments of the invention.

However, one skilled in the art will understand that the invention may be practiced without these details. In other instances, well known structures and functions have not been shown or described in detail to avoid unnecessarily obscuring the description of the embodiments of the invention. While aspects of the invention are described herein as employing the Bluetooth protocol, those skilled in the relevant art will recognize that aspects of the invention are equally applicable with other communication protocols and standards, including wireless networking protocols such as IEEE 802.11, contactless smart cards, IrDA standards, Home RF, etc.

Figure 1:
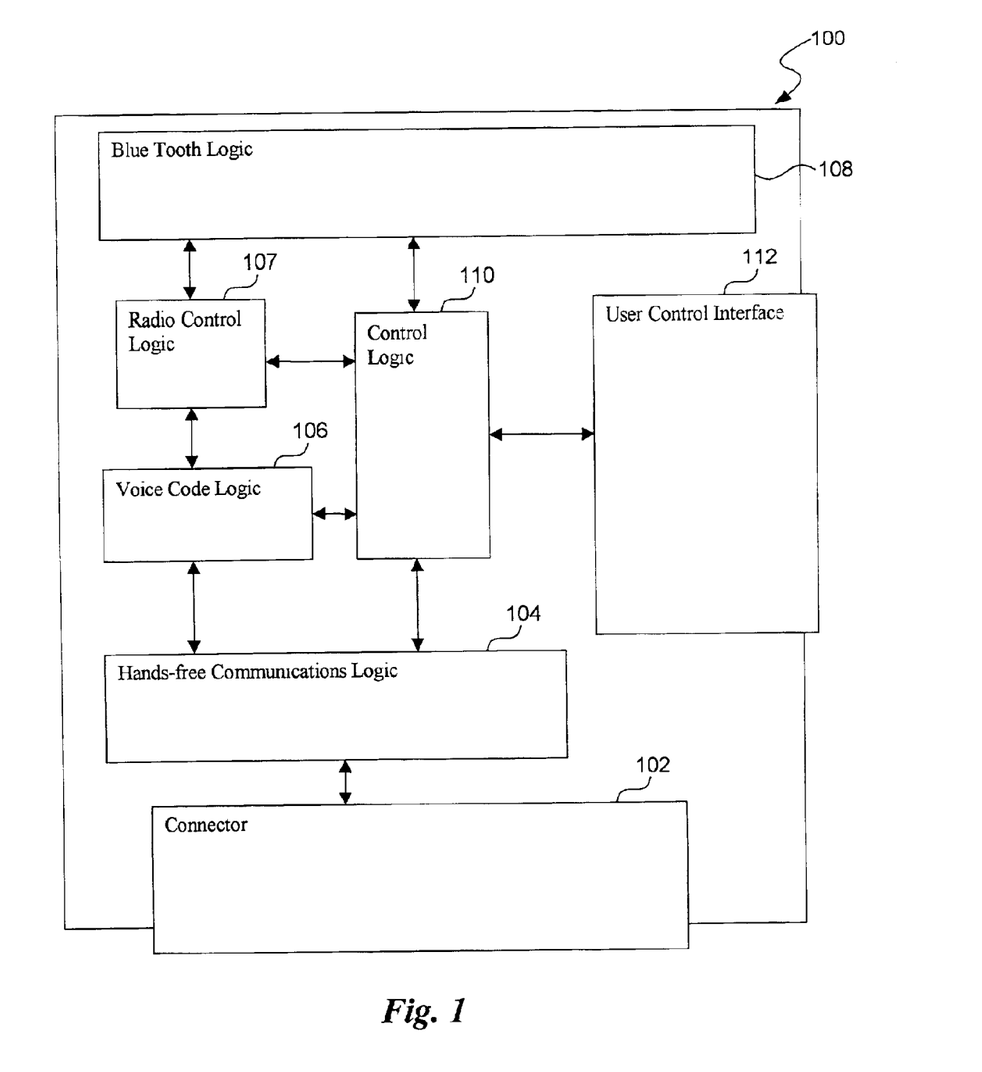
FIG. 1 shows a block diagram of the adapter module where in one embodiment of the invention the adapter module is adapted to communicate with both a hands-free car kit, and a Bluetooth-enabled mobile device substantially according to the Bluetooth specification.

Turning to FIG. 1, an adapter module 100 is shown. The adapter module 100 contains a connector 102 for physically and electrically mating with a corresponding connector in a cradle of a hands-free car kit (shown elsewhere).

Note that the invention is not limited to electrical communications, other forms of communications, such as optical communications are also envisioned. The connector 102 is also connected to hands-free communication logic 104. The hands-free communication logic 104 contains circuitry for exchanging digitized or analog voice signals, depending on the type of hands-free car kit is being used, with the hands-free car kit through the connector 102. The hands-free communication logic 104 is adapted for communication with a particular hands-free car kit or set of hands-free car kits. The number of different adapter modules 100 corresponds to the number of different hands-free car kit communication styles. The hands-free communication logic 104 exchanges voice signals with voice codec logic 106 which converts the voice signals into an encoded speech format for exchange with radio codec logic 107. In one embodiment the voice codec logic 106 converts analog signals into a digital form before converting them into an encoded speech format. The radio codec logic 107 exchanges the voice signals with the voice codec logic 106 and Bluetooth logic 108. The radio codec logic 107 exchanges a bit stream of digitized voice signals with the Bluetooth logic 108. Note that the radio codec logic 107 is shown separate from the Bluetooth logic 108 for illustration purposes. The radio codec logic 107 may be considered as part of the Bluetooth logic 108.

Analogous to the hands-free communication logic 104, the Bluetooth logic 108 contains circuitry for wirelessly exchanging digitized voice signals with an external device, e.g., the Bluetooth-enabled mobile device, substantially according to the Bluetooth specification. The Bluetooth logic 108 performs encryption and decryption of the voice signals under the Bluetooth specification for wireless communications. The Bluetooth logic 108 may include an antenna suitable for communications under Bluetooth specification or may be operatively coupled to an external antenna. Bluetooth chips and/or chipsets are expected to be available in commercial quantities from Ericsson (Sweden), Motorola (Illinois), and Nokia (Finland), among others. The hands-free communication logic 104, the voice codec logic 106, the radio codec logic 107, the Bluetooth logic 108 and a user control interface 112 are connected to and controlled by control logic 110. The control logic 110 may include a central processing unit (known as a "CPU") and memory, which in one embodiment is flash memory. The user control interface 112 includes buttons, visual indicators such as LEDs and/or lights and associated drivers and logic to receive input from the user and display status conditions back to the user, in general, to provide the interface between the user and the adapter module 100. For example, the user control interface 112 may, for example, indicate successful adapter module 100 and hands-free car kit mating, power on-off or the establishment of communications with a Bluetooth-enabled mobile device or other device. In another embodiment, the adapter module 100 is not limited to voice signals, but is adapted to exchange voice and/or data signals, e.g., for exchanging data with other parts or contents of the vehicle capable of exchanging data.

By way of example, in one embodiment, a user driving her vehicle may make or accept a phone call with a friend on the user's Bluetooth-enabled mobile telephone handset. The user speaks into the microphone associated with the hands-free car kit and the user's voice is digitized and transmitted from the hands-free car kit through the connector 102 on the adapter module 100 to the hands-free communication logic 104. The hands-free communication logic 104 interfaces with the hands-free car kit and passes the digitized voice signals to the voice codec logic 106, which in turn creates encoded speech with the voice signals, and passes the voice signals to the radio codec logic 107. The radio codec 107 translates the encoded voice signals into a bit stream representation and sends the voice signals to the Bluetooth logic 108 under control of the control logic 110. The Bluetooth logic 108 takes the digitized voice signals and passes them wirelessly, and substantially according to the Bluetooth specification, to the user's Bluetooth-enabled device, which transmits the digitized voice signals to the user's friend via the wireless and possibly other networks to the friend's telephone.

The friend vocally responds to the user and the friend's voice is transmitted to the user's Bluetooth-enabled mobile device. The Bluetooth-enabled mobile device passes the friend's digitized voice signals to the Bluetooth logic 108 in the adapter module 100 substantially according to the Bluetooth specification. The Bluetooth logic 108 passes the digitized voice signals to the radio codec logic 107 in a bit stream format. The radio codec logic 107 transforms the voice signal bit stream into an encoded voice signal format passes the voice signals to the Voice Coded logic which decodes the voice signal and passes it to the hands-free communication logic 104. The hands-free communication logic 104 transmits the digitized voice signals through the connector 102 in the format expected by the hands-free car kit. The hands-free car kit plays the friend's vocal response on speakers connected to the hands-free car kit.

In one embodiment the adapter module 100 enables backward compatibility of this invention such that two users can use the hands-free car kit, one user with a Bluetooth-enabled device, the other with a non-Bluetooth handset for which the hands-free car kit had originally been purchased.

Figure 2:
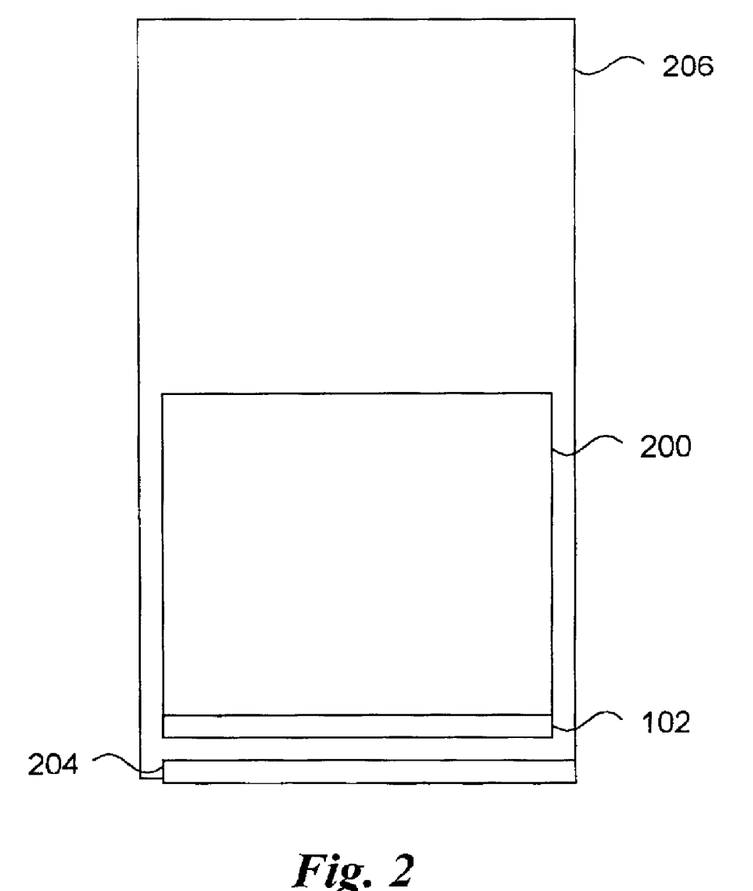
FIG. 2 shows an adapter module including a plan view of the adapter module where in one embodiment of the invention the adapter module is adapted to communicate with both a hands-free car kit, and a Bluetooth-enabled mobile device substantially according to the Bluetooth specification.

In one embodiment of the invention illustrated in FIG. 2, an adapter module 200 is shown. As described herein, the adapter module 200 contains the connector 102 for physically and electrically mating with a corresponding cradle connector 204 in a hands-free car kit cradle 206. Signals are exchanged between adapter module 200 and the hands free car kit cradle 206 via the mated connectors 102, 204. The signals move in a bi-directional fashion across the mated connectors 102, 204. Electrical power is also provided to the adapter module 200 through the mated connectors 202, 204.

The user, or others, can easily install the adapter module 200 into the cradle 206 by inserting the adapter module 200 into the cradle 206 with the adapter module connector 102 facing the cradle connector 204, and pushing the adapter module 200 closer to the cradle connector 204 until a physical and electrical connection between the connectors 102, 204 is made, resulting in the connectors 102, 204 being mated. The adapter module connector 102 is brought into alignment with the cradle connector 204 in order for mating to occur. The invention is not limited to any one particular embodiment for ensuring that the connectors 102, 204 are properly aligned in order to be mated. For example, the adapter module 200 may be physically keyed so that misorientation is not possible, likewise, the connectors 102, 204 may also be keyed. The connectors may also be made symmetrical so orientation is less important. Markings can be placed on the surface of the adapter module 200, and corresponding instructions included in an accompanying manual, to guide the user in making a proper connection. In one embodiment one or more small lights, such as an light emitting diode (known as an "LED") is controlled by the user control interface 112 in the adapter module 200 and placed on a surface of the adapter module opposite the connector 102. One of the small lights indicate that a proper connection has been made and the setup is working.

Figure 3:
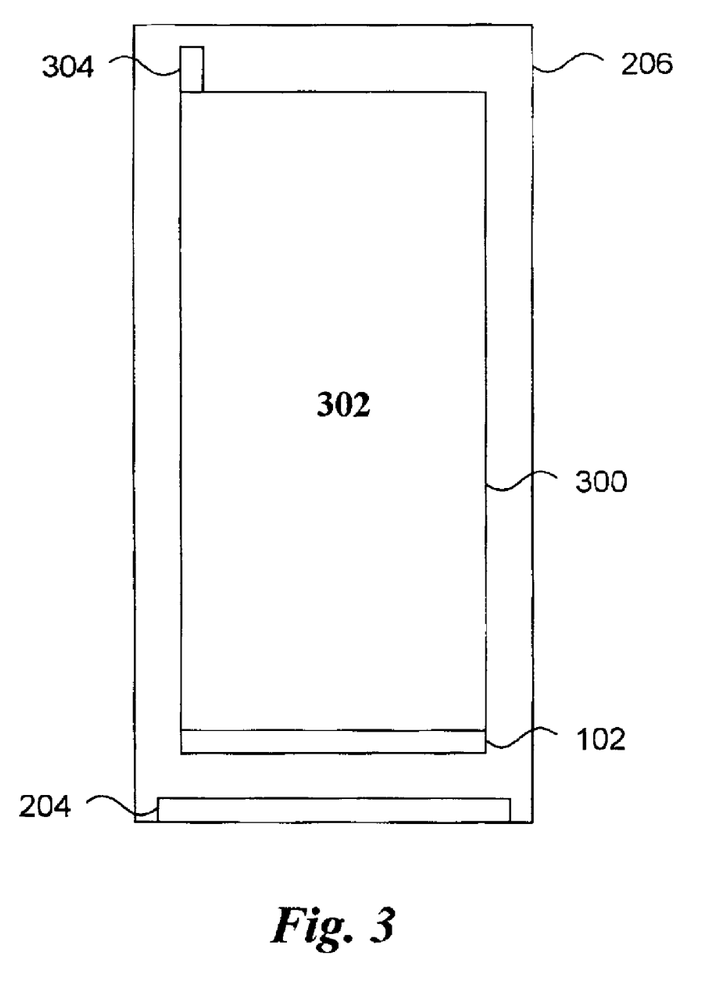
FIG. 3 shows an adapter module where in one embodiment of the invention the adapter module is shown with an alternative physical configuration adapted to communicate with both a hands-free car kit, and a Bluetooth-enabled mobile device substantially according to the Bluetooth specification.

An alternative embodiment of the invention illustrated in FIG. 3 is shown as an adapter module 300. In general, alternatives and alternative embodiments described herein are substantially similar to previously described embodiments, and common elements are identified by the same reference numbers. Only significant differences in construction or operation are described in detail. The adapter module 300 in this embodiment is shaped similarly to the mobile handset that the hands-free car kit cradle 206 was designed to receive in order to prevent items, such as a different mobile device, from being inserted into the cradle. This provides an indication to the user and others that the cradle is in use and they should not attempt to force objects into it and provides a cleaner appearance. In this or other embodiments, the adapter module 300 may have various markings such as those described herein as well as one or more trademarks and/or other symbols as desired such as trademarks of the manufacturer and a Bluetooth trademark as an indication of Bluetooth compatibility. In this or other embodiments the adapter module may contain an antenna portion 304 which functions to aid the adapter module to communicate with a Bluetooth-enabled device.

Figure 4:
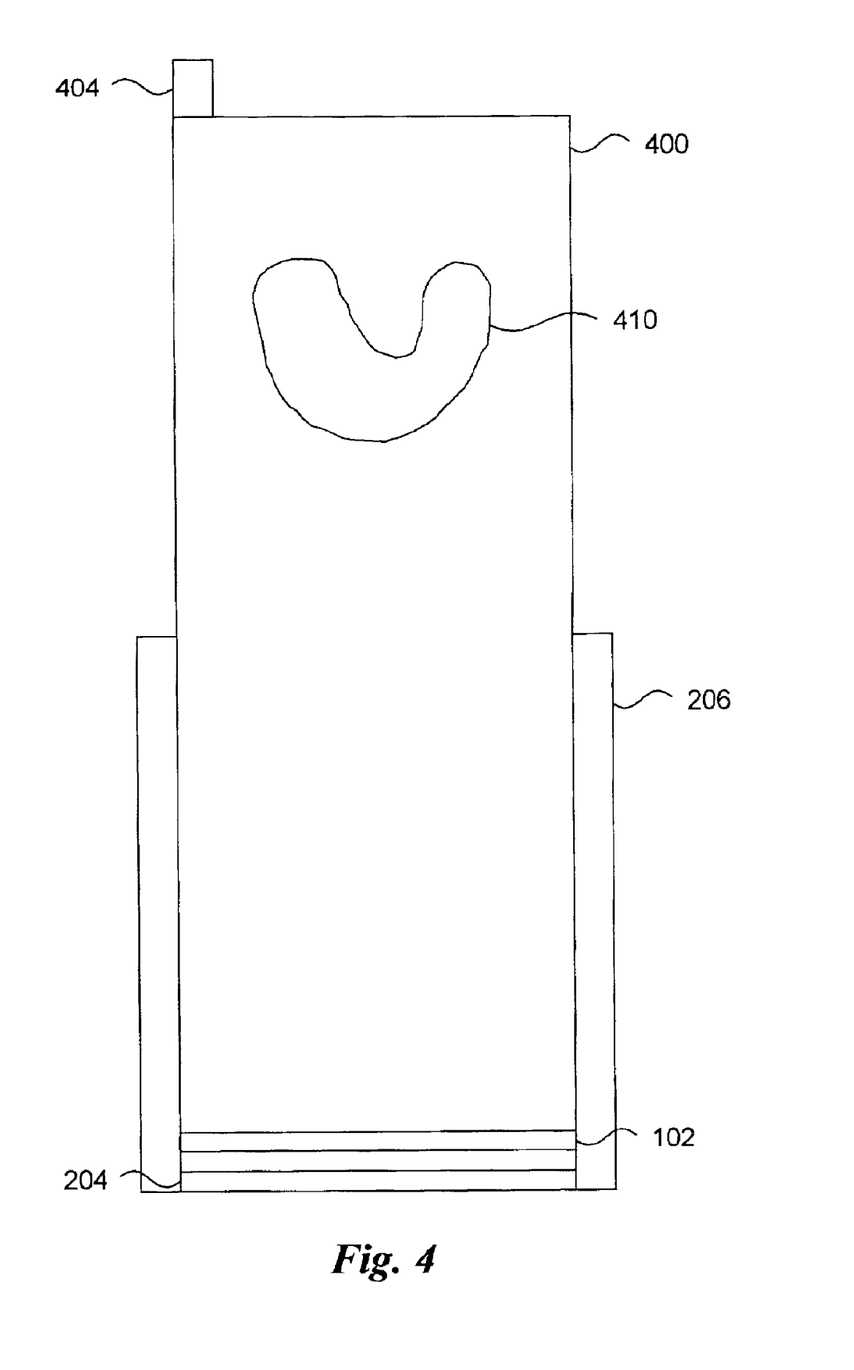
FIG. 4 shows an adapter module including a block diagram of the adapter module where in one embodiment of the invention the adapter module is shown with an alternative physical configuration adapted to communicate with both a hands-free car kit, and a Bluetooth-enabled mobile device substantially according to the Bluetooth specification.

In a second alternative embodiment of the invention illustrated in FIG. 4, an adapter module 400 is shown. In one portion, the adapter module 400 in this embodiment is shaped similarly to the mobile handset that the hands-free car kit cradle 206 was designed to receive in order to prevent items, such as a different mobile handset, from being inserted into a cradle 206. The adapter module contains an antenna portion 404 which functions to aid the adapter module to communicate with a Bluetooth-enabled device. As described herein, the adapter module 400 contains the connector 102 for physically and electrically mating with a corresponding cradle connector 204 in a hands-free car kit cradle 206. The user, or others, can easily install the adapter module 400 into the cradle 206 by inserting the adapter module 400 into the cradle 206 with the adapter module connector 406 facing the cradle connector 204, and pushing the adapter module 400 closer to the cradle connector 204 until a physical and electrical connection between the connectors 102, 204 is made, resulting in the connectors 102, 204 being mated. The adapter module 400 further has a clip 410 for holding the user's Bluetooth enabled device having a compatible protrusion for the convenience of the user.

Figure 5:
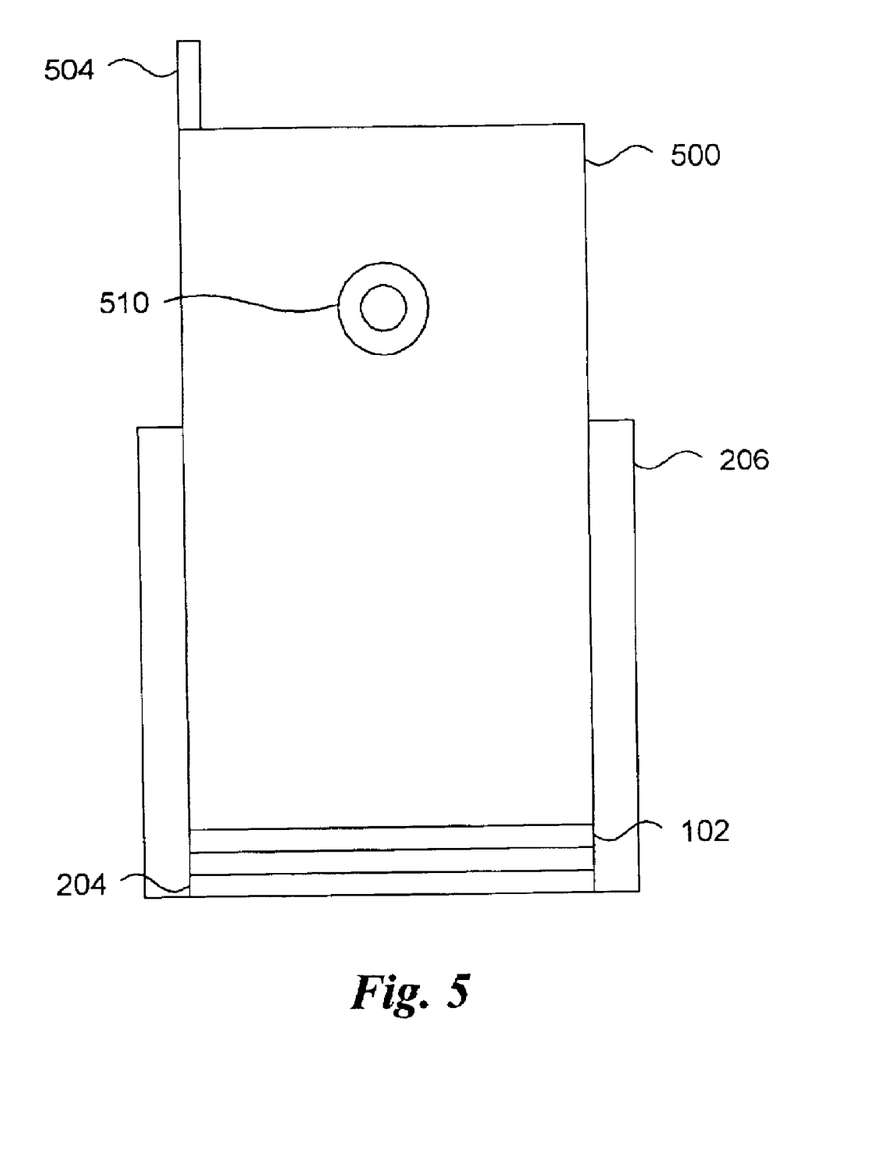
FIG. 5 shows an adapter module including a block diagram of the adapter module where in one embodiment of the invention the adapter module is shown with an alternative physical configuration adapted to communicate with both a hands-free car kit, and a Bluetooth-enabled mobile handset substantially according to the Bluetooth specification.

In a third alternative embodiment of the invention illustrated in FIG. 5, an adapter module 500 is shown. In one portion, the adapter module 500 in this embodiment is shaped similarly to the mobile handset that the hands-free car kit cradle 206 was designed to receive in order to prevent items, such as a different mobile handset, from being inserted into a cradle 206. The adapter module 500 contains the antenna portion 504 which functions to aid the adapter module to communicate with a Bluetooth-enabled device. The adapter module 500 further has a button 510 for holding the user's Bluetooth-enabled device having a compatible clip for the convenience of the user.

Figure 6:
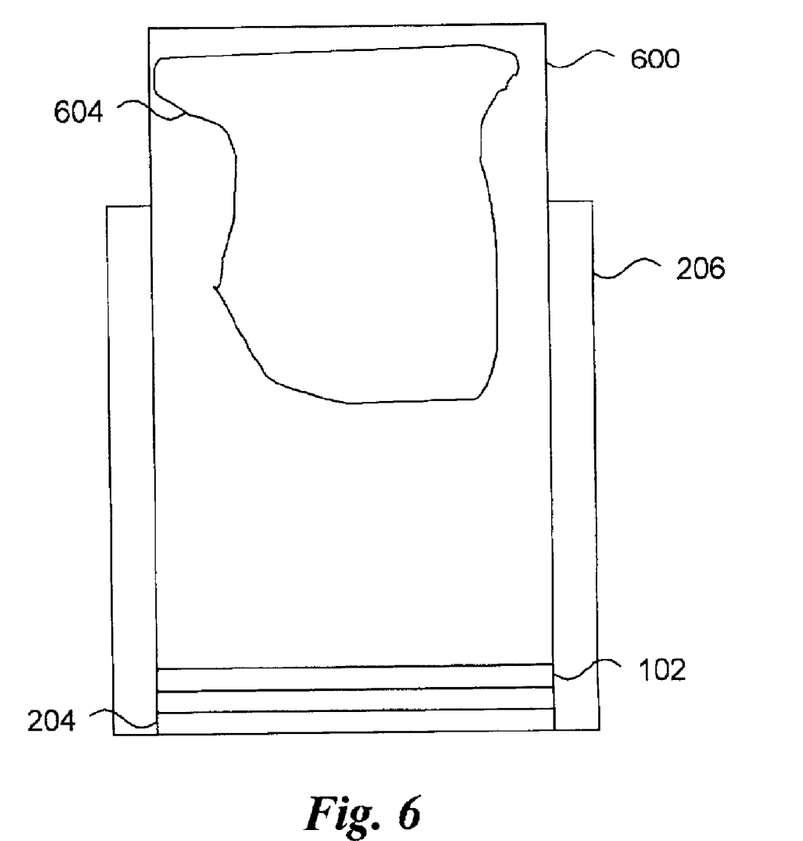
FIG. 6 shows an adapter module including a block diagram of the adapter module where in one embodiment of the invention the adapter module is shown with an alternative physical configuration adapted to communicate with both a hands-free car kit, and a Bluetooth-enabled mobile device substantially according to the Bluetooth specification.

In a fourth alternative embodiment of the invention illustrated in FIG. 6, an adapter module 600 is shown. In one portion, the adapter module 600 in this embodiment is shaped similarly to the mobile handset that the hands-free car kit cradle 206 was designed to receive in order to prevent items, such as a different mobile handset, from being inserted into a cradle 206. The adapter module contains an adapter cradle portion 604 which forms a new cradle to hold a Bluetooth-enabled device for the convenience of the user. The user places their Bluetooth-enabled mobile device into the adapter cradle portion 604. In one embodiment, no connectors are used to connect the handset to the adapter cradle portion 604 because the handset and the adapter cradle portion 604 use wireless communications substantially according to the Bluetooth specification. In an alternative embodiment a dummy connector is used to better hold the Bluetooth-enabled mobile device in place. In yet another embodiment, the adapter module contains a connector for providing electrical power to the Bluetooth-enabled mobile device.

Figure 7:
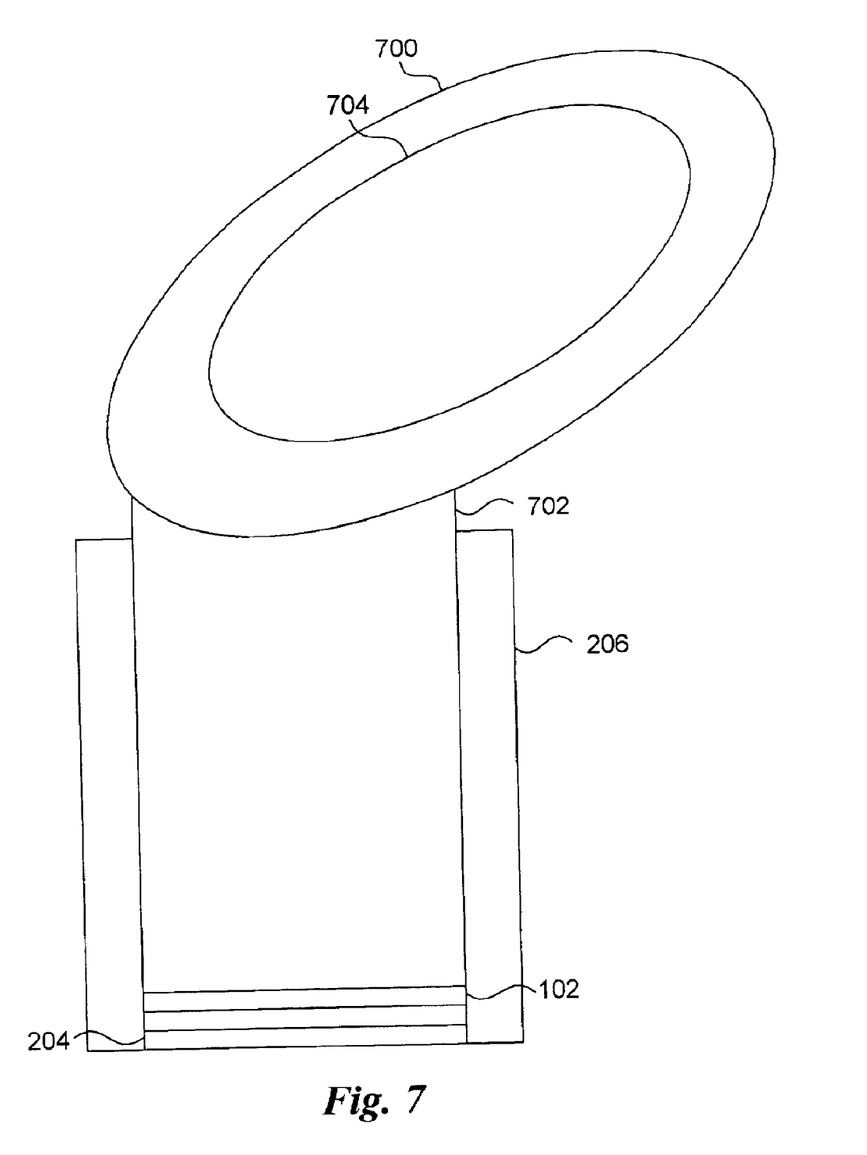
FIG. 7 shows an adapter module including a block diagram of the adapter module where in one embodiment of the invention the adapter module with an alternative physical configuration adapted to communicate with both a hands-free car kit, and a Bluetooth-enabled mobile device substantially according to the Bluetooth specification.

In a fifth alternative embodiment of the invention illustrated in FIG. 7, an adapter module 700 is shown. In one proximal portion 702 with respect to the hands-free car kit cradle 206, the adapter module 700 in this embodiment is shaped similarly to the mobile handset that the hands-free car kit cradle 206 was designed to receive in order to prevent items, such as a different mobile handset, from being inserted into the cradle 206. The adapter module also contains an adapter cradle portion 704 which forms a new cradle to hold a Bluetooth-enabled device for the convenience of the user. The user places their Bluetooth-enabled mobile device into the adapter cradle portion 704 as described in relation to FIG. 6, however, the adapter cradle portion 704 may be at any angle with respect to the cradle 206. In one embodiment the adapter cradle portion 704 is on a pivot connected to the proximal portion 702. In an alternative embodiment the adapter cradle portion 704 is connected by a telescoping mount to the proximal portion 702. In yet another embodiment the adapter cradle portion 704 is on a flexible mount connected to the proximal portion 702. In still another embodiment the adapter cradle portion 704 is on a hinged mount connected to the proximal portion 702.

Figure 8:
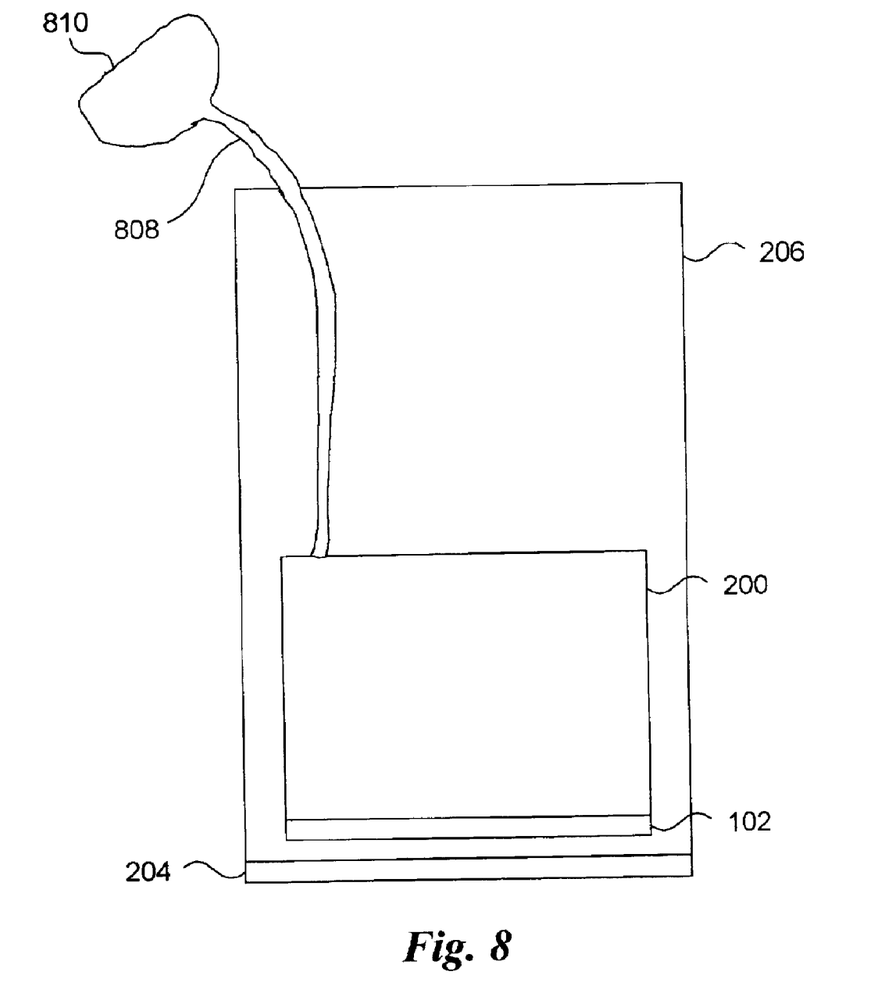
FIG. 8 shows an adapter module including a block diagram of the adapter module where in one embodiment of the invention the adapter module with a power charging cord in alternative physical configuration adapted to communicate with both a hands-free car kit, and a Bluetooth-enabled mobile device substantially according to the Bluetooth specification.

In a sixth alternative embodiment of the invention illustrated in FIG. 8, an adapter module 200 is shown. The adapter module contains an additional power charging cord 808, not shown in FIG. 2. The power cord 808 receives electrical power from the hands-free car kit through the mated connectors 102, 204. The electrical power is carried through the adapter module 200 to the power charging cord 808 which itself has a connector portion 810 for connecting to a Bluetooth-enabled mobile device or other Bluetooth-enabled device and for providing electrical power to such handset or device.

The advantages of the invention combine to overcome or mitigate a number of shortcomings of prior hands-free car kits as well as provide additional benefits. For example, embodiments of the invention overcome the problem of users having to replace existing or incompatible hands-free car kits because they have acquired, or wish to acquire, a new Bluetooth-enabled mobile device, by giving such incompatible car kits a Bluetooth communications capability with the adapter module. This allows any Bluetooth-enabled device to communicate through an adapter module compatible with any particular hands-free car kit. Thus the invention overcomes the need to replace an installed hands-free car kit because the user wants a different mobile device. Embodiments of the invention mitigate the problem of the associated time, money and effort required to have an existing hands-free car kit removed and a replacement hands-free car kit professionally installed in their vehicles, by providing an adapter module for the existing hands-free car kit so it no longer requires replacement. In one embodiment it is expected that users could quickly and easily install the adapter module by sliding it into their existing hands-free cradles. It is also expected that the adapter module will be considerably less expensive than replacing a handsfree car kit, thereby reducing the amount of time, money and effort required to gain a compatible hands-free car kit for their Bluetooth-enabled device.

Those skilled in the relevant art will appreciate that while adapter modules are described herein in combination with Bluetooth communications, the invention may employ any wireless communication standard or device. Such a standard or device may have less functionality and be cheaper to implement than the described adapter module. Aspects of the invention can be embodied in a special purpose computer or data processor that is specifically programmed, configured, or constructed to perform one or more of the computer-executable instructions explained in detail herein. Indeed, the term "adapter module", as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes. Further, although embodiments of the invention have primarily been discussed in the context of an adapter module for retrofitting hands free car kits for use with mobile devices having short range wireless networking capabilities, it will be apparent to one skilled in the art that the disclosed innovations are equally applicable to adapting hands free car kits to conform with many other capabilities of various mobile devices.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein can be applied to other systems, not necessarily the system described herein. The various embodiments described herein can be combined to provide further embodiments. These and other changes can be made to the invention in light of the detailed description.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

Incorporated by reference herein are all above references, patents, or applications and the following U.S. patent applications, which are assigned to the assignee of this application: patent application Ser. No. 10/036,188, entitled, Apparatus For Providing Power And Wireless Protocol Capability To A Mobile Device, Such As A Wireless Phone, filed Dec. 31, 2001, and patent application Ser. No. 10/036, 109, entitled, System and Method For Providing An Adapter Module, filed Dec. 31, 2001. Aspects of the invention can be modified, if necessary, to employ the systems, functions and concepts of the various patents and applications described above to provide yet further embodiments of the invention. These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

We claim:

1. A system for use with a Bluetooth-enabled wireless device and a hands-free car kit having a cradle, the cradle having a cradle connector, comprising:
   an adapter module, the adapter module further comprising:
      Bluetooth logic substantially compatible with at least one Bluetooth standard to wirelessly exchange communication signals with the Bluetooth-enabled wireless device,
      hands-free communication logic substantially compatible with the hands-free car kit to exchange communication signals with the hands-free car kit, the Bluetooth logic being communicatively coupled to the hands-free communication logic to exchange communication signals,
      an adapter connector corresponding to the cradle connector, the adapter connector being adapted to transfer electrical power from the hands-free car kit to the adapter module and to exchange communication signals between the hands-free communication logic in the adapter module and the hands-free car kit, and
      a housing for enclosing at least part of the Bluetooth logic and the hands-free communication logic, the adapter connector being at least partially secured by the housing and wherein the housing is shaped and sized to fit at least partially into the cradle,
      wherein the Bluetooth logic, hands-free communication logic and adapter connector are configured to permit communications between the Bluetooth enabled wireless headset and the hands-free car kit.

2. The system of claim 1, wherein the adapter module further comprises:
   a user control interface, the user control interface controlling at least one light emitting device to indicate a state of the adapter module, and
   control logic, the control logic being communicatively coupled to the Bluetooth logic, the hands-free communication logic and the user control interface,
   wherein the control logic provides control signals to the Bluetooth logic and the hands-free communication logic to control the exchange of communication signals between the Bluetooth-enabled wireless device and the hands-free car kit.

3. A system for use with a hands-free car kit having a cradle for receiving a wireless device and a Bluetooth-enabled wireless device, comprising:
   an adapter module, the adapter module further comprising:
      Bluetooth logic substantially compatible with at least one Bluetooth standard to exchange communication signals with the Bluetooth-enabled wireless device,
      hands-free communication logic substantially compatible with the hands-free car kit to exchange communication signals with the hands-free car kit,
      wherein the Bluetooth logic is communicatively coupled to the hands-free communication logic to exchange communication signals between the Bluetooth-enabled wireless device and the hands-free car kit.

4. The system of claim 3, wherein the adapter module further comprises:
   a user control interface, the user control interface controlling at least one LED to indicate a state of the adapter module,
   control logic, the control logic being communicatively coupled to the Bluetooth logic, the hands-free communication logic and the user control interface,
   wherein the control logic provides control signals to the Bluetooth logic and the hands-free communication logic to control the exchange of communication signals between the Bluetooth-enabled wireless device and the hands-free car kit.

5. The system of claim 3, wherein the adapter module further comprises a housing for enclosing at least part of the Bluetooth logic and the hands-free communication logic, wherein the housing is shaped and sized to fit at least partially into the cradle.

6. An adapter module for use with a hands-free car kit and a wireless device wherein the wireless device has a primary wireless communications capability for communicating with other wireless devices and secondary wireless communications capability, the adapter module comprising:
   wireless transceiver circuitry, the wireless transceiver circuitry being substantially compatible with the wireless device's secondary communications capability to exchange communication signals with the wireless handset; and hands-free communication logic, the hands-free communication logic being substantially compatible with the hands-free car kit to exchange communication signals with the hands-free car kit, the hands-free communication logic being communicatively coupled to the wireless transceiver circuitry logic to exchange communication signals between the wireless handset and the hands-free car kit.

7. The system of claim 6, wherein the wireless handset's primary wireless communications capability and secondary wireless communications capability operate according to incompatible signaling principles.

8. The system of claim 6, wherein the wireless handset's primary wireless communications capability and secondary wireless communications capability operate according to compatible signaling principles.

9. The system of claim 6, wherein the wireless handset's secondary wireless communications capability operates substantially according to IEEE 802.11.

10. The system of claim 6, wherein the wireless handset's secondary wireless communications capability operates substantially according to a Bluetooth standard.

11. The system of claim 6, wherein the wireless handset's secondary wireless communications capability operates substantially according to a wireless networking protocol.

12. The system of claim 6, wherein the wireless handset's secondary wireless communications capability operates substantially according to at least one standard associated with contactless smart cards.

13. The system of claim 6, wherein the wireless handset's secondary wireless communications capability operates substantially according to at feast one IrDA standard.

14. The system of claim 6, wherein the wireless handset's secondary wireless communications capability operates substantially according to a Home RF standard.

15. A system for adapting a hands-free car kit having a cradle, comprising:
an adapter module, the adapter module further comprising:
Bluetooth communication means for wirelessly exchanging communication signals with a Bluetooth-enabled wireless device, and
hands-free communication means for exchanging communication signals with the hands-free car kit, the Bluetooth communication means being communicatively coupled to the hands-free communication means for exchanging communication signals.

16. The system of claim 15, further comprising:
an adapter connector means for transferring electrical power from the hands-free car kit to the adapter module and for exchanging communication signals between the hands-free communication means in the adapter module and the hands-free car kit.

17. The system of claim 15, wherein the adapter module further comprises control means for providing control signals to the Bluetooth communication means and the hands-free communication means for controlling the exchange of communication signals between the Bluetooth-enabled wireless device and the hands-free car kit.

18. The system of claim 15, wherein the adapter module further comprises a housing that at least partially encloses the Bluetooth communication means, the hands-free communication means and the control means, wherein said housing is designed to mate with said cradle.

19. A system for adapting a hands-free car kit for communications with a Bluetooth-enabled wireless device, comprising:
an adapter module, the adapter module further comprising Bluetooth communication means for exchanging communication signals with the Bluetooth-enabled wireless device, hands-free communication means for exchanging communication signals with the hands-free car kit, the Bluetooth communication means being communicatively coupled to the hands-free communication means for exchanging communication signals between the Bluetooth-enabled wireless device and the hands-free communication means.

20. The system of claim 19, wherein the adapter module further comprises control means for providing control signals to the Bluetooth communication means and the hands-free communication means in order to control the exchange of communication signals between the Bluetooth-enabled wireless device and the hands-free car kit.

21. The system of claim 19, wherein the adapter module further comprises a housing means for substantially enclosing Bluetooth communication means, the hands-free communication means, and the control means, the housing means being adapted to mate with said hands free car kit.

22. A method of adapting a hands-free car kit for communications with a Bluetooth-enabled wireless device, comprising:
receiving communication signals from the hands-free car kit with hands-free communication logic;
passing the communication signals from the hands-free communication logic to Bluetooth logic;
converting the communication signals from a first form used by the hands-free car kit to a second form used by the Bluetooth-enabled wireless device; and
transmitting the communications signals in the second form to the Bluetooth-enabled wireless device.

23. A computer-readable medium whose contents cause control logic in an adapter module to perform a method to adapt a hands-free car kit for communications with a Bluetooth-enabled wireless device, the method comprising:
receiving communication signals from the Bluetooth-enabled wireless device with Bluetooth logic;
passing the communication signals from the Bluetooth logic to hands-free communication logic;
converting the communication signals from a first form used by the Bluetooth-enabled wireless device to a second form used by the hands-free car kit under the direction of control logic; and
transmitting the communications signals in the second form to the hands-free car kit.

24. A system for use with a Bluetooth-enabled wireless device, comprising:
a hands-free car kit,
an adapter module, the adapter module further comprising:
Bluetooth logic substantially compatible with at least one Bluetooth standard to exchange communication signals with the Bluetooth-enabled wireless device,
hands-free communication logic substantially compatible with the hands-free car kit to exchange communication signals with the hands-free car kit,
wherein the Bluetooth logic is communicatively coupled to the hands-free communication logic to exchange communication signals between the Bluetooth-enabled wireless device and the hands-free car kit.

25. A method for manufacturing an adapter module, comprising:
integrating Bluetooth logic, hands-free communication logic and control logic into an adapter module, and
at least partially enclosing the Bluetooth logic, hands-free communication logic and control logic in a housing adapted to fit into a hands-free car kit cradle.

* * * * *

UNITED STATES PATENT AND TRADEMARK OFFICE
CERTIFICATE OF CORRECTION

PATENT NO. : 6,889,065 B2
DATED : May 3, 2005
INVENTOR(S) : David William James Holmes et al.

It is certified that error appears in the above-identified patent and that said Letters Patent is hereby corrected as shown below:

<u>Column 11,</u>
Line 31, "feast" should be -- least --.

Signed and Sealed this

Sixteenth Day of August, 2005

JON W. DUDAS
*Director of the United States Patent and Trademark Office*